United States Patent [19]

Nishizawa

[11] Patent Number: 5,144,291
[45] Date of Patent: Sep. 1, 1992

[54] MEANS FOR ELIMINATING HIDDEN SURFACE

[75] Inventor: Teiji Nishizawa, Ikoma, Japan

[73] Assignee: Matsushita Electric Industrial Co., Ltd., Osaka, Japan

[21] Appl. No.: 115,411

[22] Filed: Nov. 2, 1987

[51] Int. Cl.$^5$ ............................................. G09G 1/16
[52] U.S. Cl. .................................... 340/729; 395/121; 395/122
[58] Field of Search ............... 340/747, 721, 729, 723, 340/703, 750, 799; 364/518, 521; 395/121, 122

[56] References Cited

U.S. PATENT DOCUMENTS

| | | | |
|---|---|---|---|
| 4,609,917 | 9/1986 | Shen | 340/747 |
| 4,679,041 | 7/1987 | Fetter et al. | 340/729 |
| 4,684,990 | 8/1987 | Oxley | 340/729 |
| 4,697,178 | 9/1987 | Heckel | 340/747 |
| 4,737,921 | 4/1988 | Goldwasser et al. | 340/720 |

OTHER PUBLICATIONS

W. M. Newman, R. F. Sproul, "Principles of Interactive Computer Graphics", pp. 366-377, 2nd Ed. McGraw-Hill, New York, (1979).
IEEE Transactions on Computers, vol. C-20, No. 6, Jun. 1971, pp. 623-629, "Continuous Shading of Curved Surfaces", Gourand, H.
1985 Chapel Hill Conference on VLSI "Super Buffer: A Systolic VLSI Graphics Engine for Real Time Raster Image Generation", Nader Gharachorloo and Christopher Pottle, pp. 285-305.
N. Gharachorloo et al., "Super Buffer: A Systolic VLSI Graphics Engine for Real Time Raster Image Generation", 1985 Chapel Gill Conference on Very Large Scale Integration, pp. 285-305.
H. Gouraud, "Continuous Shading of Curved Surfaces", IEEE Transactions on Computers, C-20 (6), Jun. 1971, pp. 623-628.

Primary Examiner—Alvin E. Oberley
Attorney, Agent, or Firm—Stevens, Davis, Miller & Mosher

[57] ABSTRACT

Pixel processors each having a depth register, an intensity register and an adder are connected in a linear array. Each pixel processor processes one pixel on a horizontal scan line. A token having plane segment information is shifted in one direction in the array, and each pixel processor updates the registers while it performs hidden surface elimination in a time-division fashion. A refresh token for an intensity data output is also shifted in one direction, and intensity data stored in each pixel processor is supplied to an intensity data bus. A hardware of the pixel processor is very much simplified and LSI implementation is facilitated while maintaining a high image output rate.

11 Claims, 8 Drawing Sheets

R: REFRESH TOKEN $$I_\alpha = I_1 \frac{Y_S - Y_2}{Y_1 - Y_2} + I_2 \frac{Y_1 - Y_S}{Y_1 - Y_2}$$

$$I_\beta = I_1 \frac{Y_S - Y_3}{Y_1 - Y_3} + I_3 \frac{Y_1 - Y_S}{Y_1 - Y_3}$$

$$I_p = I_\alpha \frac{X_\beta - X_p}{X_\beta - X_2} + I_\beta \frac{X_p - X_2}{X_\beta - X_2}$$

MEANS FOR ELIMINATING HIDDEN SURFACE

BACKGROUND OF THE INVENTION

1. FIELD OF THE INVENTION

The present invention relates to means for eliminating hidden surface in a three-dimensional computer graphics device for displaying a three-dimensional polyhedral object on a two-dimensional screen.

2. DESCRIPTION OF PRIOR ART

When a three-dimensional object is to be displayed on a two-dimensional screen, it is necessary to deal with a phenomenon in which a front object hides all or a portion of a rear object. In general, a scan line algorithm which serially processes by a general purpose processor and a Z-buffer algorithm which is suitable for hardware implementation have been known. In the Z-buffer algorithm, color and intensity (hereinafter simply referred to as intensity) of a plane to be displayed and a depth of the plane are stored for each pixel, and each time a new plane is inputted, the stored depth and a new plane depth are compared, and only when the new plane depth is smaller, the stored depth is updated and intensity data of the new plane is registered. When depth registers (generally called Z buffer) are provided for all pixels, a very large memory is required but a control logic is relatively simple.

On the other hand, in the scan line algorithm, the fact that when intensity data of each pixel is to be displayed for each raster scan like in a CRT, adjacent pixels and pixels on immediately adjacent scan lines have very strong correlation with the current pixel, is taken into account. It is suitable for a sequential processor but requires many operations and the control logic is complex.

As an intermediate method of those hidden line elimination algorithms, an algorithm which utilizes the correlation for cross-scan line and the Z-buffer algorithm within the line has been proposed by N. Gharachorloo et al, "Super Buffer: A Systolic VLSI Graphics Engine for Real Time Raster Image Generator", 1985 Chapel Hill Conference on Very Large Scale Integration, pp. 285–305.

FIG. 1 shows a system block diagram of the proposed means for eliminating hidden surface. Numeral 100 denotes a pixel processor, provided one for each of pixels on an N-pixel scan line. The pixel processor comprises a pixel number register which stores a location of the pixel on the scan line, a depth register which stores a depth coordinate of a plane which is present frontmost as viewed from the pixel location, an intensity register which stores intensity information of the plane, adders for updating the depth coordinate, a pixel number comparator and a depth coordinate comparator.

An operation of the means for eliminating the hidden surface thus configured is now explained with reference to a conceptual chart shown in FIG. 2.

As shown in FIGS. 2A and 2B, a plane 200 defined in a three-dimensional space (generally called normalized device coordinates) including X and Y coordinates corresponding to an M × N two-dimensional screen and depth information or Z coordinate, is projected onto an XY plane to display it on the screen. In a raster scan type CRT, this process is performed for each horizontal scan. The process is done on the XZ plane sectioned along a current scan line. A sectional plane sectioned along the current scan line is called a plane segment 201. Each plane segment has left end coordinates $(X_L, Z_L)$, a right end X coordinate $X_R$, a Z coordinate displacement per unit pixel $dZ/dX$ (hereinafter designated by $Z'$) and intensity information I. Tokens having those information are supplied to the leftmost pixel processor 100 of the array of pixel processors provided one for each pixel as shown in FIG. 1. Each pixel processor 100 first determines if its location ID on the scan line (pixel number register) meets $$XL_i \leq ID \leq XR_i \tag{1}$$

If it is met, the pixel processor determines if the Z coordinate $Z_i$ of the input token is smaller than data $Z_b$ stored in the depth register. If it is met, the data $Z_i$ and the intensity information $I_i$ in the input token are stored into the depth register and the intensity register, respectively. When the relation (1) is met, the Z coordinate displacement $Z_i'$ is added irrespective of the magnitude of the Z coordinate, and other parameters are outputted as they are to the right side pixel processor.

When all plane segments on one scan line have been inputted in the form of token to the leftmost pixel processor of the array, intensity data stored in the pixel processors are read out. To this end, refresh tokens different from the plane segment tokens are inputted to the left end of the array. The refresh token has information to distinguish it from other tokens. The refresh operation is explained with reference to FIGS. 1 and 3. When the pixel processor detects the input of the refresh token R, it outputs the data $I_b$ of the intensity register to the left side pixel processor, and in other cases, it outputs the intensity data from the right side pixel processor to the left side pixel processor. As shown in FIG. 3, the refresh token R propagates in the array and the intensity data is outputted on the left side of the array at every other cycle.

In a graphic display device which approximates a three-dimensionally defined object by a polyhedron, transforming coordinates and displaying it on a two-dimensional screen, a smooth shading method may be employed to smoothly change the intensity of displayed polygon in order to enhance a stereographic feeling.

The smooth shading method is disclosed by H. Gouraud "Continuous Shading of Curved Surfaces", IEEE Transactions on Computers, C-20 (6), June 1971, pp. 623–628.

FIG. 4 illustrates a principle of the smooth shading method. Intensities $I_1$, $I_2$ and $I_3$ given to vertices of the polygon are linearly interpolated for edges, and then intensities $I_\alpha$ and $I_\beta$ at crosspoints of the edges and the raster scan line are linearly interpolated to calculate an intensity $I_p$ of any pixel.

SUMMARY OF THE INVENTION

It is an object of the present invention to provide means for eliminating hidden surface which facilitates LSI implementation of an array system by constructing pixel processors by simplified hardwares and which allows a high image output rates.

The present invention provides means for eliminating hidden surface having pixel processors connected in a linear array, which comprises a depth register for storing a depth, an intensity register for storing intensity data, an adder for determining an extent of a plane segment, adding a depth displacement and comparing depth data in a time-division fashion, input/output means for updating information on an input plane segment token and outputting the updated information through one stage of pipeline registers, and an intensity data bus for outputting the content of the intensity register.

Each pixel processor performs various comparisons and data updatings by using one adder in a time-division fashion. As a result, the pixel processor can be implemented by a very simplified circuit. Each pixel processor need not have a unique pixel number ID and the array system may be constructed by the repetition of the identical circuits. Thus, the entire array system can be very easily implemented by an LSI. In spite of the fact that one hardware is used in the time-division fashion, the contents of the intensity registers of the pixel processors can be outputted at a highest rate (1 pixel/cycle time).

DESCRIPTION OF THE PREFERRED EMBODIMENTS

Figure 1:
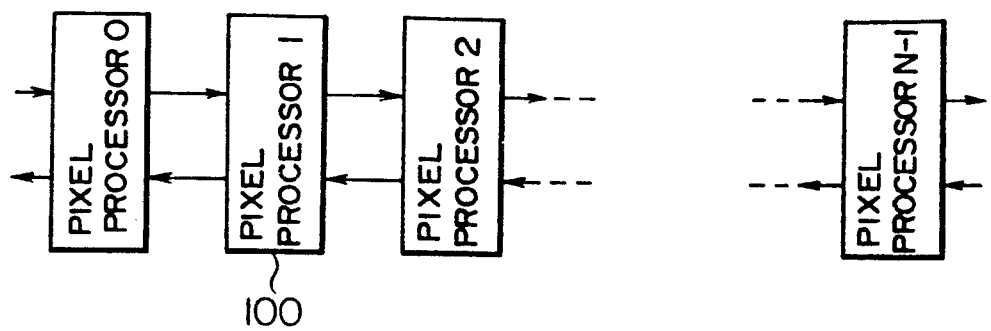
FIG. 1 shows a block diagram of the prior art means for eliminating hidden surface, FIGS. 2A and 2B explain concept common to the means for eliminating hidden surface.
Figure 2A:
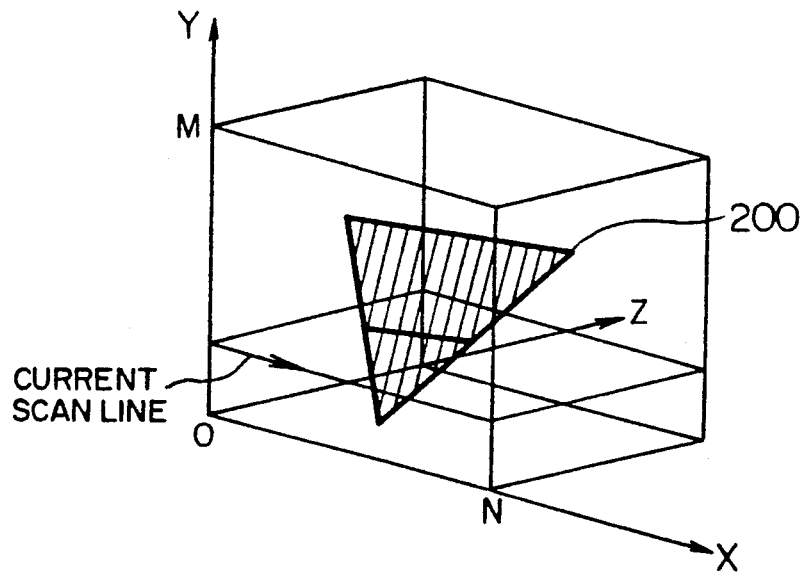
Figure 2B:
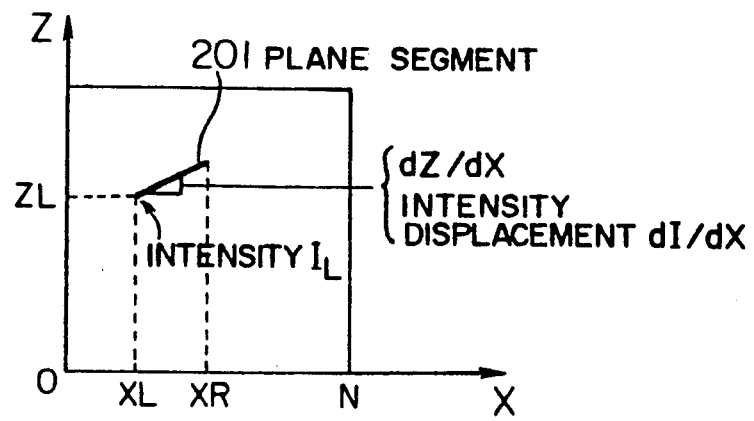
Figure 3:
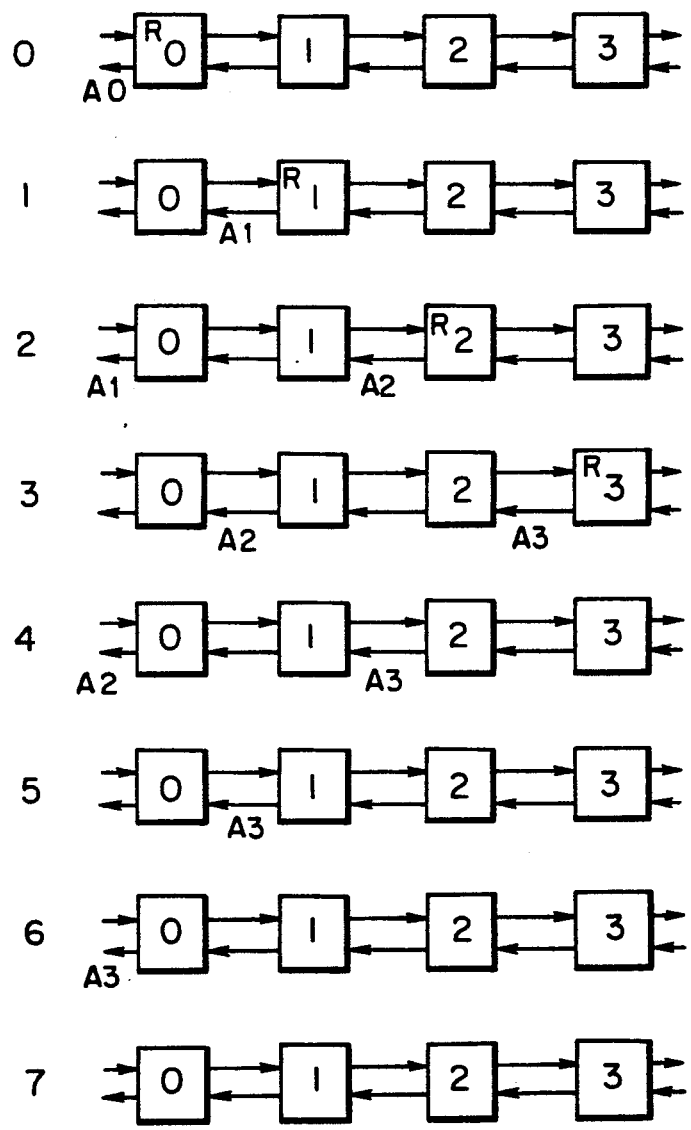
FIG. 3 illustrates flow of a refresh token on an array in the prior art means.
Figure 4:
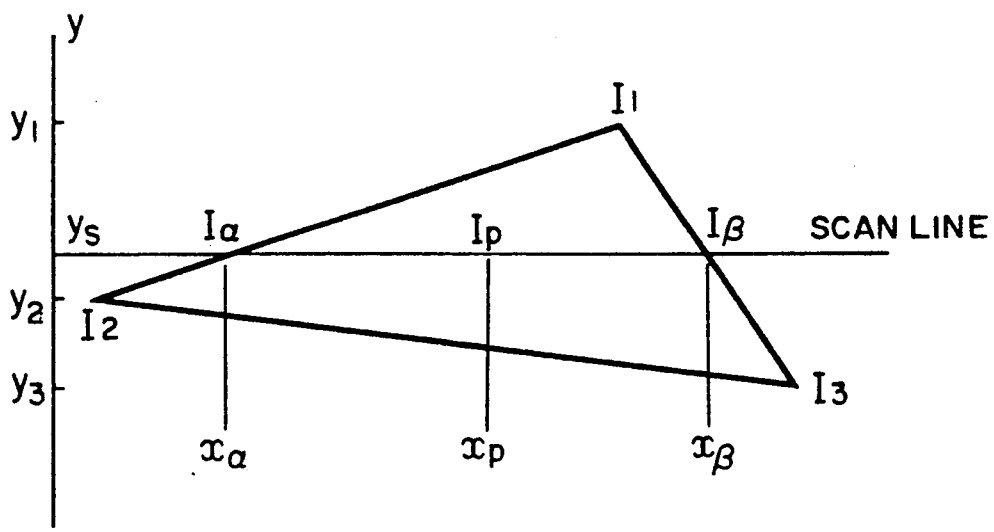
FIG. 4 illustrates a principle of smooth shading.
Figure 5A:
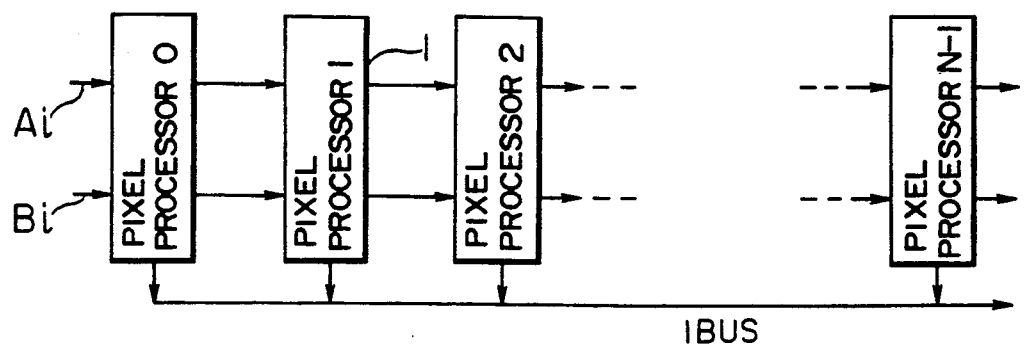
FIGS. 5A and 5B show block diagrams of one embodiment of the means for eliminating hidden surface of the present invention.
Figure 5B:
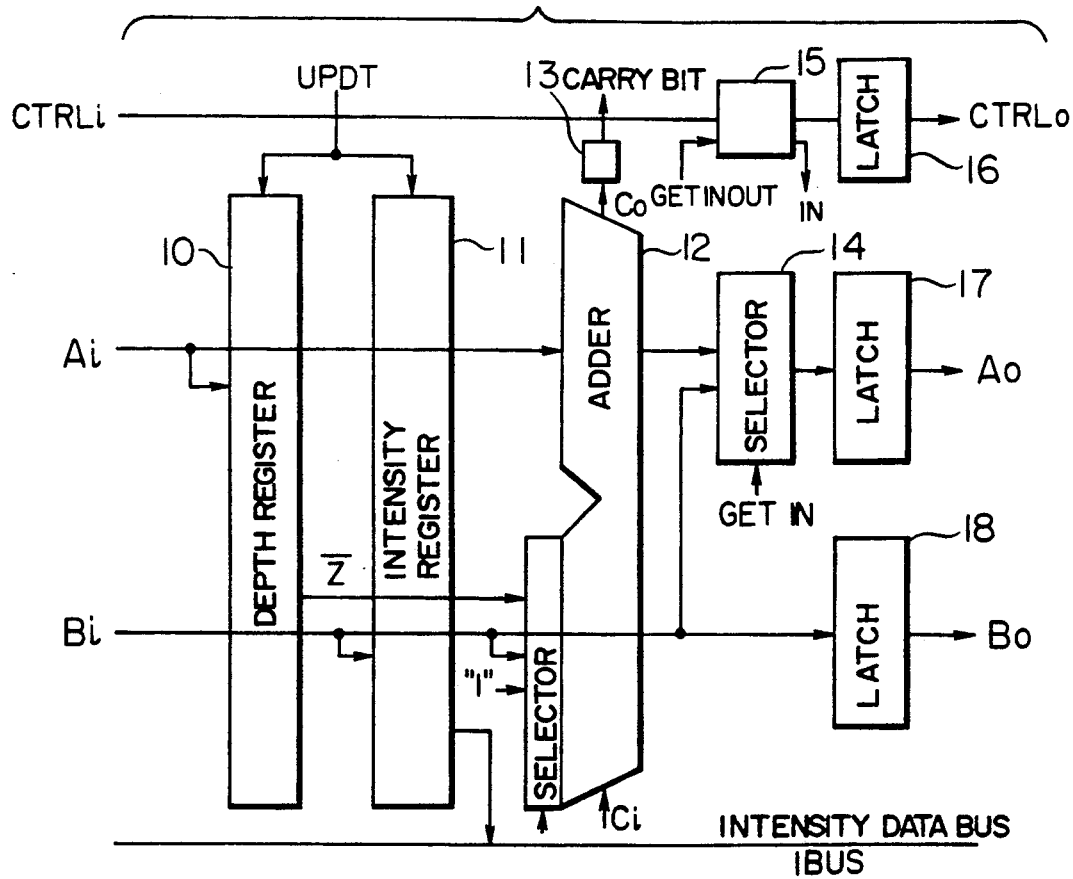

FIG. 5A shows a system block diagram of one embodiment of the means for eliminating hidden surface of the present invention, and FIG. 5B shows a detail of the components. In FIG. 5A, numeral 1 denotes a pixel processor which is provided one for each of pixels on an N-pixel scan line, numeral 10 denotes a depth register for storing a depth coordinate of a frontmost plane as viewed from the pixel, and numeral 11 denotes an intensity register for storing intensity information of the plane.

An operation without smooth shading in the present embodiment is now explained.

A right end information of a plane segment is given by the number of continuous pixels dX is place of a coordinate. A token having left end coordinates ($X_L$, $Z_L$), the number of continuous pixels dX, a Z coordinate displacement per unit pixel Z′, and intensity information I is supplied to A input port Ai and B input port Bi of the leftmost pixel processor 1 of the array of pixel processors shown in FIG. 5A. Control information CTRLi includes IN flag information which indicates that the plane segment is within the range. The information applied to the input ports in a time-division fashion are summerized as follows.

|       | CTRL    | A port              | B port |
|-------|---------|---------------------|--------|
| $T_1$ | IN flag | X (IN=0)<br>dX (IN=1) | dX     |
| $T_2$ |         | Z                   | Z′     |

-continued

|       | CTRL | A port | B port |
|-------|------|--------|--------|
| $T_3$ |      | Z      | I      |

Figure 6A:
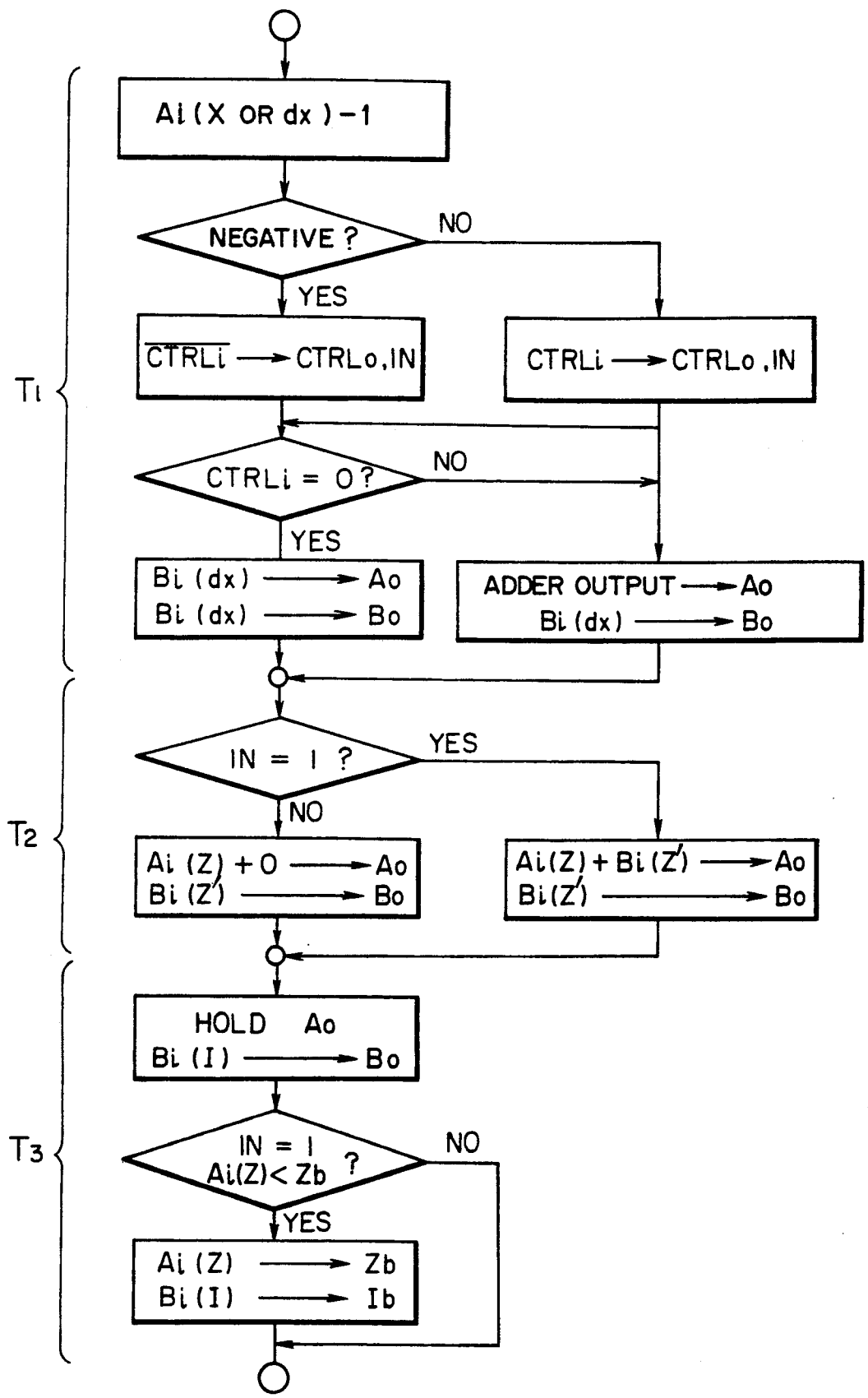
FIGS. 6A and 6B show flow charts of processes performed by the pixel processor of the embodiment.

The operation of the pixel processor is explained with reference to FIGS. 5A, 5B and 6A. At a first timing $T_1$, the data at the A input port $A_i$ and all-"1" pattern are supplied to the adder 12 to decrement the data of the A port by one. If IN flag is 0 and the decremented result is negative, it means that the plane segment is within the range at the current pixel location. Thus, the data dX at $B_i$ is selected by the selector 14, shifted to the A port and latched in the latch 17. The IN flag is changed to "1" and latched in the latch 16. If the IN flag is "1" and the decremented result is negative, it means that the plane segment is outside the range. Thus, the IN flag is changed to "0" and the negative value (maximum integer without sign) is outputted to the A output port. In other cases, CTRLi is outputted as it is to CRTLo, and the adder output is supplied to Ao.

At a second timing $T_2$, if the IN flag is "1", Z at the A input port Ai and Z′ at the B input port Bi are added and a sum is supplied to the A output port Ao. In other case, the data at Ai is supplied to Ao without updating it.

Lastly, at a third timing $T_3$, the data at the A output port Ao is held as it was at the timing $T_2$. If the IN flag is "1" and the comparison by the adder 12 of the data Z on the A input port Ai and the data $Z_b$ in the depth register 10 shows $Z < Z_b$, the data Z on the A input port and the data I on the B input port are stored into the depth register 10 and the intensity register 11, respectively.

At those three timings, the contents of all B input ports Bi are supplied to the B output port Bo through the latch 18.

Figure 7A:
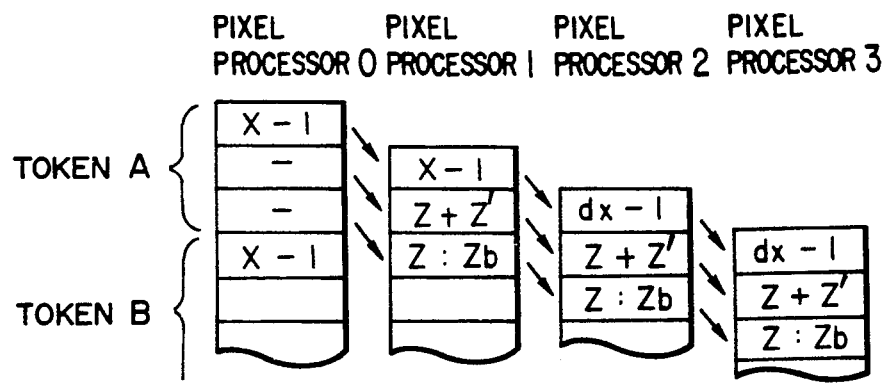
FIGS. 7A and 7B illustrate flow of plane segment tokens processed in the pixel processors.

FIG. 7A shows a time sequential flow of tokens having plane segment information while they are processed by the pixel processors. In FIG. 7A, the token A is a plane segment starting from a pixel number X = 1. The pixel processor 0 decrements it by one resulting in 0. Thus, updating of Z and comparison with $Z_b$ are not carried out. In the pixel processor 1, it is further decremented by one resulting in a negative value. Thus, dX is supplied to the A output port instead of X so that dX is decremented in the subsequent pixel processors. The pixel processor 1 further changes the IN flag to "1", and updates Z and compares it with $Z_b$. In the succeeding stage pixel processors, dX is sequentially decremented by one until the result becomes negative. When it becomes negative, the IN flag is changed back to "0" so that the updating of Z and the comparison with $Z_b$ are not carried out in the subsequent pixel processors (A maximum value is outputted to Ao). Since the operation in each pixel processor may start at the time when it has received the result of the preceding stage pixel processor, one stage of pipeline register is sufficient.

Figure 8A:
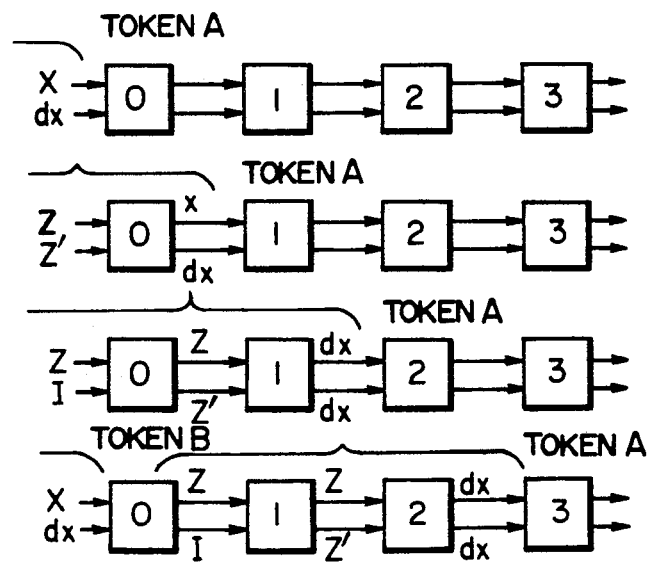
FIGS. 8A, 8B and 8C illustrate flow of plane segment tokens and a refresh token through the array of the embodiment.

FIG. 8A illustrates a flow of tokens having the same plane segment information as that of FIG. 7A while they are processed by the pixel processors.

The operation with smooth shading of the present embodiment is now explained.

Right end information of the plane segment is given by the number of continuous pixels dX instead of the coordinates. A token having left end coordinates ($X_L$, $Z_L$), the number of continuous pixels dX, a Z coordinate displacement per unit pixel $Z'$, intensity information $I$ at the left end and an intensity displacement per unit pixel $I'$ is supplied to the A input port Ai and the B input port Bi of the leftmost pixel processor 1 of the array of pixel processors shown in FIG. 5A. The control information CRTLi includes IN flag information which indicates that the plane segment is within the range.

The information applied to the input ports in the time-division fashion are summerized as follows.

|  | CTRL | A port | B port |
|---|---|---|---|
| $T_1$ | IN flag | X (IN=0) | dX |
|  |  | dX (IN=1) |  |
| $T_2$ |  | Z | Z' |
| $T_3$ |  | Z | — |
| $T_4$ |  | I | I' |

Figure 6B:
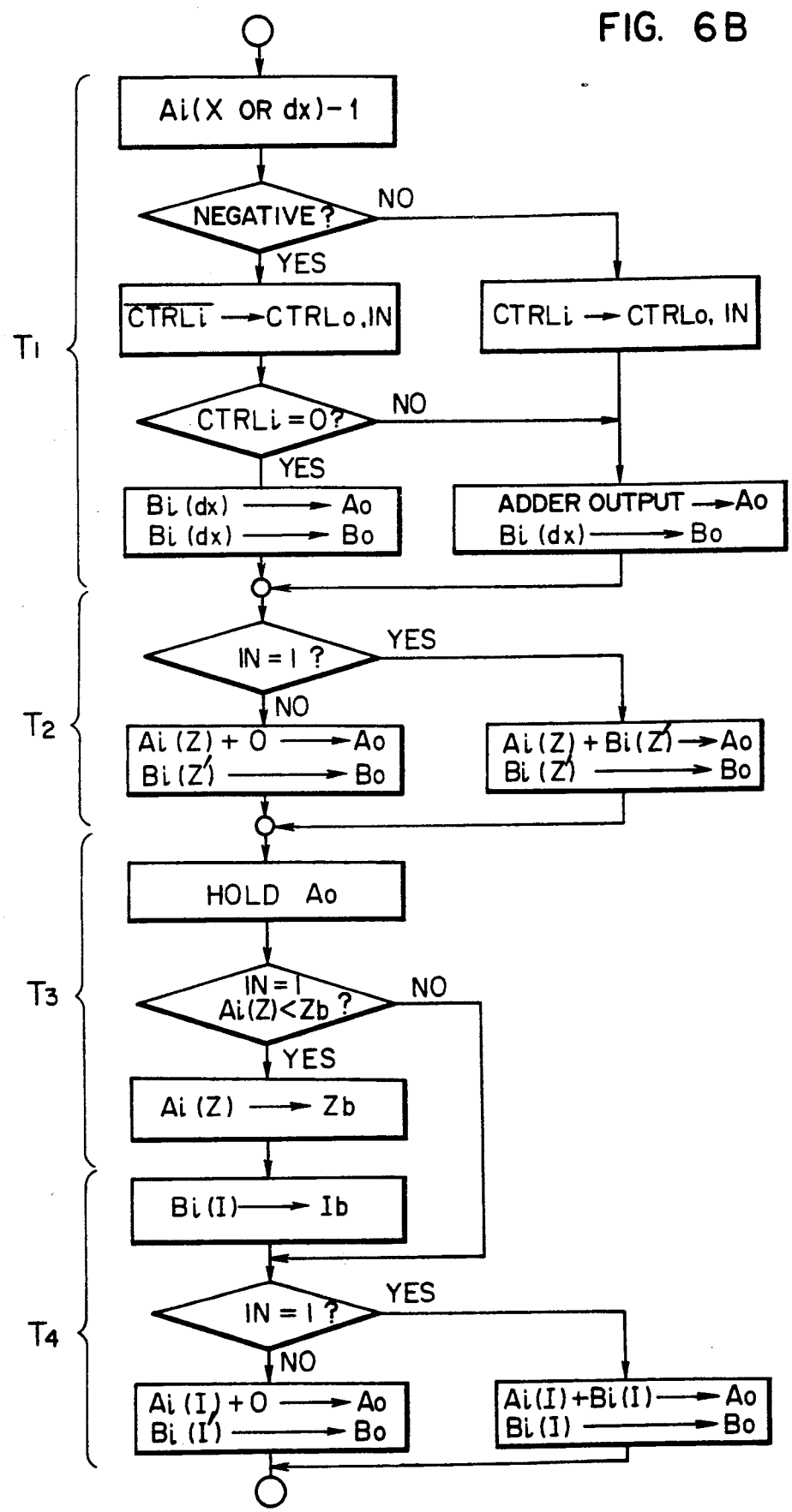

The operation of the pixel processors is explained with reference to FIGS. 5A and 5B and FIG. 6B. At a first timing $T_1$, the data at the A input port Ai and all-"1" pattern are supplied to the adder 12 to decrement the A input data by one. If the IN flag is "0" and the decremented result is negative, it means that the plane segment is within the range. Thus, the data dX at Bi is shifted to the A port by the selector 14 and latched into the latch 17, and the IN flag is changed to "1" and latched to the latch 16. If the IN flag is "1" and the decremented result is negative, it means that the plane segment is outside of the range. Thus, the IN flag is changed to "0" and the negative value (maximum integer without sign) is supplied to the A output port. In other cases, CTRLi is supplied as it is to CTRLo and the output of the adder is supplied to Ao.

At a second timing $T_2$, if the IN flag is "1", the data Z on the A input port Ai and the data Z' on the B input port Bi are added and a sum is supplied to the A output port Ao. In other case, the data on Ai is supplied to Ao without updating it.

At a third timing $T_3$, the same data at the A output port Ao as that at the timing $T_2$ is held. If the IN flag is "1" and the comparison by the adder 12 of the data Z on the A input port Ai and the data $Z_b$ in the depth register 10 shows $Z < Z_b$, the data Z on the A input port is stored into the depth register 10.

Lastly, at a fourth timing $T_4$, if the IN flag is "1" and the comparison result is $Z < Z_b$, the data I on the B input port is stored into the intensity register 11. If the IN flag is "1", the data I on the A input port Ai and the data I' on the B input port Bi are added and a sum is supplied to the A output port Ao. In other case, the data on Ai is supplied to Ao without updating it.

At those four timings, the contents of all B input ports Bi are supplied to the B output port Bo through the latch 18.

Figure 7B:
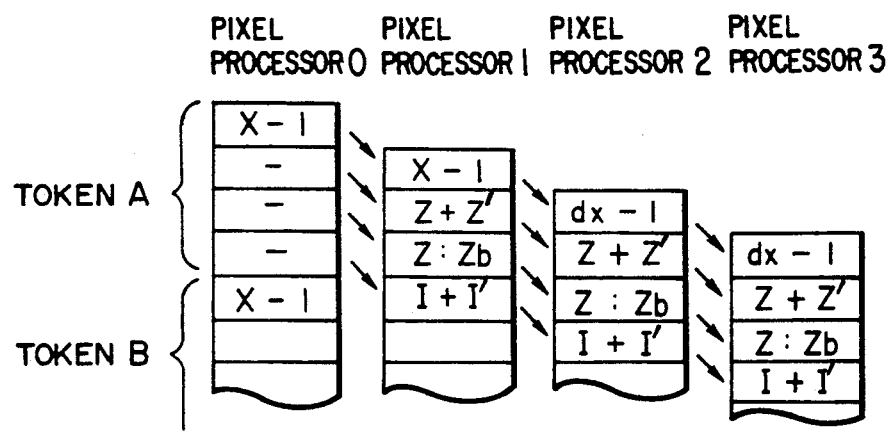

FIG. 7B shows a time sequential flow of tokens having plane segment information while they are processed by the pixel processors. In FIG. 7B, the token A is a plane segment starting from a pixel number $X = 1$. In the pixel processor 0, it is decremented by one resulting in 0. Accordingly, the updating of Z and comparison with $Z_b$ are not carried out. In the pixel processor 1, it is further decremented by one resulting in a negative value. Thus, dX is supplied to the A output port in place of X, and dX is decremented in the subsequent pixel processors. The pixel processor 1 further changes the IN flag to "1", and updates Z and compares it with $Z_b$. In the succeeding stage pixel processors, dX is sequentially decremented by one until the decremented result becomes negative. When it becomes negative, the IN flag is reset to "0" so that the subsequent pixel processors do not update Z nor compare it with $Z_b$ (A maximum value is outputted to Ao). Since the operation in each pixel processor may be started in the time when it has received the result of the preceding pixel processor, one stage of pipeline register is sufficient.

Figure 8B:
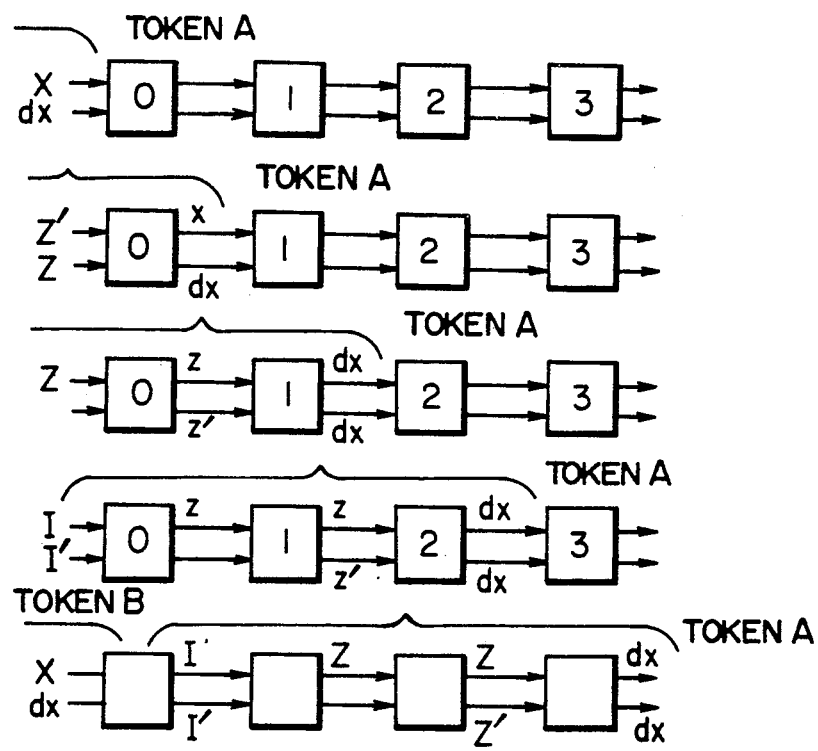

FIG. 8B shows a flow of tokens having the same plane segment information as that of FIG. 7B while they are processed by the pixel processors.

Figure 8C:
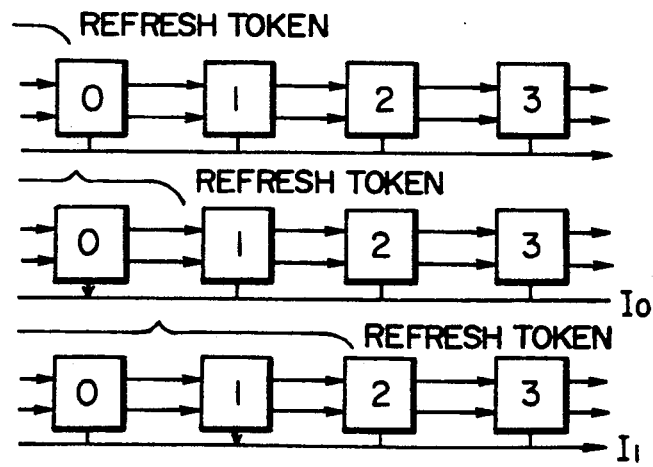

In the above description, whether the smooth shading is used or not, it is possible to insert an identifier to distinguish the plane segment from the refresh token, into non-used $T_2$ or $T_3$ timing slot at the path of the CTRL signal. The operation of the pixel processor when it receives the refresh token is explained with reference to FIGS. 5A and 5B and FIG. 8C.

When the pixel processor 1 detects the refresh token, it supplies the data $I_b$ in the intensity register 11 to the intensity data bus IBUS. Since the refresh token propagate to the next pixel processor for each cycle, the intensities of the pixels to be displayed are sequentially outputted when the intensity data bus IBUS is monitored. After the refresh token has been inputted to the left and, a plane segment token for a new scan line may be continuously inputted.

In the present embodiment, all plane segment data which require updating are collected at the A input/output ports. Alternatively, the data may be exchanged between the A port and the B port so long as the order of input of the data is not changed.

A bit width necessary for the addition of Z and Z' is twice as long as the depth precision. For example, if the depth precision is 16 bits, the addition of 32 bits including 16 bit for integer portion and 16 bits for fraction is required. This is almost two times as long as the bit width required for other addition (subtraction and comparison). In the present embodiment, the addition of Z and Z' is carried out only in the second timing $T_2$. If the operation is carried out in two cycles, the bit width of the adder may be reduced to one half. Namely, the hardware of the adder may be reduced to one half by processing each token at four timings (T1, T21, T22, T3) when the smooth shading is not included, and in fine timings (T1, T21, T22, T3, T4) when the smooth shading is included. The number of tokens which can be inputted in a unit time decreases but the intensity data is outputted in each cycle because the flow rate of the token on the array does not change.

I claim:

1. Means for eliminating hidden surface in a graphic display device for displaying a three-dimensional polyhedral object on a two-dimensional screen while performing hidden surface elimination, comprising:
  pixel processors provided one for each of pixels on one scan line of a screen;
  each of said pixel processors including:
  a depth register for storing a depth ($Z_b$) of a frontmost plane segment;
  an intensity register for storing intensity data ($I_b$) of the plane;
  an adder;
  means for receiving a token having a token plane segment information from the pixel processor for an adjacent preceding stage pixel, said plane segment information comprising leading pixel location (X), number of continuous pixels (dX), depth for the leading pixel (Z), depth displacement per unit pixel (dZ/dX) and intensity data (I);

means for outputting a token having the updated plane segment information to the pixel processor for an adjacent succeeding stage pixel through one stage of pipeline registers;

means for reading out the data ($I_b$) stored in said intensity register;

wherein:

at a first timing, whether the pixel processor is within the range of presence on the scan line of a new plane segment inputted by said input means is determined by supplying the leading pixel location (X) or the number of continuous pixels (dX) to said adder, and if it is within the range;

at a second timing, the displacement data (dZ/dX) is added to the depth data (Z) by said adder and a sum is supplied to the succeeding stage pixel processor; and at a third timing, the depth data (Z) and the current depth data ($Z_b$) in the depth register are compared by said adder, and only when $Z < Z_b$ or $Z \leq Z_b$, the contents of the depth register and the intensity register are substituted by the depth data (Z) and the intensity of data (I) of the new plane segment.

2. Means for eliminating hidden surface according to claim 1 wherein when a refresh token representing end of scan line is supplied in place of the token having the plane segment information from the preceding stage pixel processor, the data ($I_b$) in the intensity register is supplied to an intensity data bus, the depth register is set to a maximum value, the intensity register is initialized to a background color and the refresh token is supplied to the succeeding stage pixel processor.

3. Means for eliminating hidden surface according to claim 1 further comprising an intensity data bus for reading out the data ($I_b$) stored in the intensity register.

4. Means for eliminating hidden surface according to claim 1 wherein the input means and the output means of the token having the plane segment information comprise a plurality of ports, respectively, the leading pixel location (X) is supplied at the first timing and the depth (Z) is supplied at the second and third timings to a first input port, the number of continuous pixels (dX), the depth displacement per unit pixel (dZ/dX) and the intensity data (I) are supplied at the first, second and third timings to a second input port, whether the plane segment is within the range of presence or not is determined by decrementing one from the leading pixel location (X) by the adder at the first timing and checking if the result is negative or no more than zero, and by decrementing one from the number of continuous pixels (dX) by the adder in the subsequent timings and checking if the result is negative or no more than zero, and the plane segment information updated by the pixel processor is supplied to first and second output ports.

5. Means for eliminating hidden surface according to claim 1 wherein the input means and the output means for the tokens having the plane segment information comprise a plurality of ports, respectively, the leading pixel location (X) is supplied if the plane segment is not within the range of presence and the number of continuous pixels (dX) is supplied if the plane segment is within the range, to a first input port at the first timing, the depth (Z) is supplied at the second and third timings to the first input port, the number of continuous pixels (dX), the depth displacement per unit pixel (dZ/dX) and the intensity data (I) are supplied at the first, second and third timings to a second input port, whether the plane segment is within the range of presence or not is determined by decrementing one by the adder from the leading pixel location (X) or the number of continuous pixels (dX) supplied from the first input port at the first timing and checking if the result is negative or zero, and if it gets in the range, the number of continuous pixels (dX) supplied from the second input port is supplied to a first output port, and in other case, the updated information supplied to the first input port is supplied to the first output port, and the number of continuous pixels (dX), the depth displacement per unit pixel (dZ/dX) and the intensity data (I) supplied to the first input port are supplied as they are to a second output port.

6. Means for eliminating hidden surface in a graphic display device for displaying a three-dimensional polyhedral object on a two-dimensional screen while performing hidden surface elimination, comprising:

pixel processors provided one for each of pixels on one scan line of a screen;

each of said pixel processors including:

a depth register for storing a depth ($Z_b$) of a frontmost plane segment;

an intensity register for storing intensity data ($I_b$) of the plane;

an adder;

means for receiving a token having plane segment information from the pixel processor for an adjacent preceding stage pixel, said plane segment information comprising leading pixel location (X), number of continuous pixels (dX), depth for the leading pixel (Z), depth displacement per unit pixel (dZ/dX) and intensity data (I);

means for outputting a token having the updated plane segment information to the pixel processor for an adjacent succeeding stage pixel through one stage of pipeline registers;

means for reading out the data ($I_b$) stored in said intensity register;

wherein:

at a first timing, whether the pixel processor is within the range of presence on the scan line of a new plane segment inputted by said input means is determined by supplying the leading pixel location (X) or the number of continuous pixels (dX) to said adder, and if it is within the range;

at a second timing, the displacement data (dZ/dX) is added to the depth data (Z) by said adder and a sum is supplied to the succeeding stage pixel processor; and at a third timing, the depth data (Z) and the current depth data ($Z_b$) in the depth register are compared by said adder, to check whether $Z < Z_b$ or $Z \leq Z_b$, and at a fourth timing, the displacement data (dI/dX) is added to the intensity data (I) by said adder and a sum is supplied to the succeeding stage pixel processor, and only when the result for the depth comparison is affirmative, the contents of the depth register and the intensity register are substituted by the depth data (Z) and the intensity data (I) of the new plane segment.

7. Means for eliminating hidden surface according to claim 6 wherein when a refresh token representing end of scan line is supplied in place of the token having the plane segment information from the preceding stage pixel processor, the data ($I_b$) in the intensity register is supplied to an intensity data bus, the depth register is set to a maximum value, the intensity register is initialized to a background color and the refresh token is supplied to the succeeding stage pixel processor.

8. Means for eliminating hidden surface according to claim 6 further comprising an intensity data bus for reading out the data ($I_b$) stored in the intensity register.

9. Means for eliminating hidden surface according to claim 6 wherein the input means and the output means of the token having the plane segment information comprise a plurality of ports, respectively, the leading pixel location (X) is supplied at the first timing, the depth (Z) is supplied at the second and third timings and the intensity data (I) is supplied at the fourth timing to a first input port, the number of continuous pixels (dX) and the depth displacement per unit pixel (dZ/dX) are supplied at the first and second timings and the intensity displacement (dI/dX) is supplied at the fourth timing to a second input port, whether the plane segment is within the range of presence or not is determined by decrementing one from the leading pixel location (X) by the adder at the first timing and checking if the result is negative, or no more than zero and by decrementing one from the number of continuous pixels (dX) by the adder in the subsequent timings and checking if the result is negative or no more than zero, and the plane segment information updated by the pixel processor is supplied to first and second output ports.

10. Means for eliminating hidden surface according to claim 6 wherein the input means and the output means for the tokens having the plane segment information comprise a plurality of ports, respectively, the leading pixel location (X) is supplied if the plane segment if not within the range of presence and the number of continuous pixels (dX) is supplied if the plane segment is within the range, to a first input port at the first timing, the depth (Z) is supplied at the second and third timings to the first input port, the intensity data (I) is supplied at the fourth timing to the first input port, the number of continuous pixels (dX), and the depth displacement per unit pixel (dZ/dX) are supplied at the first and second timings to a second input port, the intensity displacement (dI/dX) is supplied at the fourth timing to the second input port, whether the plane segment is within the range of presence or not is determined by decrementing one by the adder from the leading pixel location (X) or the number of continuous pixels (dX) supplied from the first input port at the first timing and checking if the result is negative (or zero), and if it gets in the range, the number of continuous pixels (dX) supplied from the second input port is supplied to a first output port, and in other case, the updated information supplied to the first input port is supplied to the first output port, and the number of continuous pixels (dX), the depth displacement per unit pixel (dZ/dX) and the intensity data (I) supplied to the first input port are supplied as they are to a second output port.

11. Means for eliminating hidden surface in a graphic display device for displaying a three-dimensional polyhedral object on a two-dimensional screen while performing hidden surface elimination, comprising:
a plurality of processors connected to form a one-dimensional array, each of said processors including a depth register for storing a depth value of a frontmost polyhedral in each pixel, an intensity register for storing intensity data relating to said polyhedral in the pixel, an adder for performing a calculation of the depth value, a region judgment relating to the polyhedral, and a size judgement regarding the depth value in a time division fashion, and a control means for storing the depth value and the intensity of the polyhedral in the depth register and the intensity register respectively only when a newly inputted depth value of a polyhedral is smaller or not larger than the stored depth value,
whereby each of said processors performs a processing operation with respect to a corresponding pixel such that said array performs hidden surface elimination for one scan line.

* * * * *